(12) United States Patent
Chaganti et al.

(10) Patent No.: US 8,693,398 B1
(45) Date of Patent: Apr. 8, 2014

(54) HIGH-AVAILABILITY MOBILE GATEWAYS HAVING INTERCHASSIS NON-UNIFORM SERVICE UNIT REDUNDANCY

(75) Inventors: Srinivasa Chaganti, San Ramon, CA (US); Apurva Mehta, Cupertino, CA (US); Samya Das Sarma, Campbell, CA (US); Bobby Vandalore, Milpitas, CA (US); Kumar Mehta, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 236 days.

(21) Appl. No.: 13/248,825

(22) Filed: Sep. 29, 2011

(51) Int. Cl.
*H04W 4/00* (2009.01)

(52) U.S. Cl.
USPC .......................................................... 370/328

(58) Field of Classification Search
USPC ........................................ 370/328, 228, 338
See application file for complete search history.

(56) References Cited

U.S. PATENT DOCUMENTS

| 2008/0044181 | A1 | 2/2008 | Sindhu | |
|---|---|---|---|---|
| 2009/0274326 | A1* | 11/2009 | Jia et al. | 381/311 |
| 2010/0220656 | A1* | 9/2010 | Ramankutty et al. | 370/328 |

OTHER PUBLICATIONS

3GPP TS 23.401, V10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 261 pp.

3GPP TS 36.300, V10.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Jun. 2010, 183 pp.
U.S. Appl. No. 12/182,619, by Jerome P. Moisand, filed Jul. 30, 2008.
U.S. Appl. No. 13/172,556, by Apurva Mehta, filed Jun. 29, 2011.
U.S. Appl. No. 12/905,771, by Venkatesh Badakere Ramachandra, filed Oct. 15, 2010.
U.S. Appl. No. 13/172,505, by Andrzej Szyszko, filed Jun. 29, 2011.
U.S. Appl. No. 13/248,834, by Srinivasa Chaganti, filed Sep. 29, 2011.
Nadas, "Virtual Router Redundancy Protocol (VRRP) Version 3 for IPv4 and IPv6," RFC 5798, Mar. 2010, 40 pp.

* cited by examiner

*Primary Examiner* — Mark Rinehart
*Assistant Examiner* — Mohammad Anwar
(74) *Attorney, Agent, or Firm* — Shumaker & Sieffert, P.A.

(57) ABSTRACT

In general, techniques are described for facilitating interchassis redundancy (ICR) among heterogenous mobile gateway member chassis that provide high-availability services as an group to one or more mobile subscribers. In one example, a member chassis of the mobile gateway comprises a control plane having a plurality of distributed subscriber management service units that serve as anchors for subscriber sessions. A redundancy group defines a backup association between one of the subscriber management service units and a subscriber management service unit of another member chassis of the mobile gateway. A routing unit of the member chassis comprises a resource manager that negotiates parameters for a communication channel for the redundancy group. A session management daemon establishes subscriber sessions anchored by the subscriber management service unit in the association and sends, via the communication channel, subscriber session data for the subscriber sessions anchored by the subscriber management service unit.

23 Claims, 7 Drawing Sheets

HIGH-AVAILABILITY MOBILE GATEWAYS HAVING INTERCHASSIS NON-UNIFORM SERVICE UNIT REDUNDANCY

TECHNICAL FIELD

The invention relates to mobile networks and, more specifically, to redundant subscriber session handling within mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an enhancement of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GPP/2) and the Worldwide Interoperability for Microwave Access (WiMAX) forum.

A typical 3GPP mobile service provider network, or mobile network, includes a core packet-switched network, a transport network, and one or more radio access networks. The core packet-switched network for the mobile network uses a variety of control protocols to authenticate users and establish logical connections, known as bearers, among the many service nodes on a path between a wireless device, attached to one of the radio access networks, and a packet data network (PDN). The service nodes then utilize the bearers, which employ data protocols, to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

A mobile service provider core network typically includes a number of mobile gateway devices that employ packet-based control and data protocols to facilitate mobile communications to provide services to mobile subscriber devices. In some cases, mobile service providers establish interchassis redundancy among two or more mobile gateways to provide high-availability to subscribers. One or more redundant mobile gateways operate as backup or "standby" devices for an active mobile gateway chassis that is currently operational to provide services to subscribers. The active mobile gateway provides continual subscriber session updates to the standby mobile gateways. Upon failure of the active mobile gateway, one of the standby mobile gateways assumes the role of active to seamlessly provide services continuity to subscribers attached the gateways using the updated subscriber sessions.

SUMMARY

In general, techniques are described for facilitating interchassis redundancy (ICR) among non-uniform or "heterogenous" mobile gateway chassis that provide high-availability services as an ICR group to one or more mobile subscribers. Each member chassis of the ICR group may internally utilize a decentralized control plane having a plurality of subscriber management service units that each anchors a subset of subscriber sessions managed by the member chassis. Moreover, individual member chassis of an ICR group may each include non-uniform architectures and configurations vis-à-vis one another that preclude a simple correspondence of constituent hardware components. For example, an active chassis of the ICR group may include high-capacity subscriber management service units each capable of anchoring a relatively higher number of mobile subscriber sessions as compared to subscriber management service units of a standby chassis of the ICR group. As another example, the active chassis and an standby chassis of an ICR group may each include a mixed architecture having a combination of high-capacity and low-capacity subscriber management service units yet be configured differently such that a high-capacity and a low-capacity subscriber management service unit may be installed to the same slot number in the active and standby chassis, respectively.

In one example implementation, an administrator or other entity configures one or more redundancy groups (RDGs) on each of the ICR group member chassis that describe a configuration and capabilities of each of the chassis components of the respective chassis on which the RDGs are stored. Each of the RDGs configured on an ICR group member chassis also stores an identifier that associates the RDG to one or more RDGs on another member chassis of the ICR group and defines a backup association between the chassis components described by the respective RDGs. A centralized resource manager of each of the ICR group member chassis negotiate communication channel parameters with which active chassis components, such as active subscriber management service units, exchange subscriber session data with corresponding backup chassis components defined by the RDG associations. The resource managers may additionally install filters, generated according to the communication channel parameters, to the forwarding planes of the ICR group member chassis to ensure internal routing of subscriber session data toward the proper chassis components. These techniques may eliminate slot location dependency that otherwise constrains ICR to group member chassis of uniform architectures and configurations.

ICR group member chassis may each additionally include a decentralized forwarding plane having a plurality of forwarding units. Forwarding units each anchor a subset of subscriber sessions for subscribers attached to the ICR group member chassis by processing packets associated with the subscriber sessions, which may include performing tunnel encapsulation/decapsulation. Subscriber sessions anchored in the control plane by a particular subscriber management service unit of the ICR group member chassis may be anchored in the forwarding plane by multiple different forwarding units. In some instances, forwarding unit RDGs (F-RDGs) define backup forwarding unit associations between forwarding units of different ICR group member chassis. Subscriber management service units that anchor subscriber sessions anchored in the forwarding plane by particular forwarding units mediate the exchange of subscriber session data for the forwarding units according to RDGs that define backup associations among the service units of the different ICR group member chassis. However, the subscriber management service units segregate exchanged subscriber session data according to the F-RDGs for the various forwarding units. Backup service units may as a result install segregated subscriber session data that defines subscriber sessions to the anchoring backup forwarding unit for the subscriber sessions based on the backup forwarding unit association with the active forwarding unit defined by the F-RDGs. In this way, each subscriber management service unit of the active ICR group member chassis need only backup a portion of rather than the entire forwarding table for the chassis.

In one embodiment, a method of providing interchassis redundancy within a mobile gateway that provides mobile service provider network subscribers with access to services of a packet data network includes receiving, with a first member chassis of the mobile gateway, a redundancy group that defines a backup association between one of a plurality of subscriber management service units of the first member chassis and one of a plurality of subscriber management service units of a second member chassis of the mobile gateway. The method also includes negotiating, with the first member chassis, parameters for a communication channel for the redundancy group, and anchoring, with the subscriber management service unit of the first member chassis, one or more subscriber sessions for subscribers attached to the mobile gateway via the mobile service provider network when the first member chassis is an active chassis for the mobile gateway. The method further includes sending, via the communication channel for the redundancy group, subscriber session data for the subscriber sessions from the subscriber management service unit of the first member chassis to the subscriber management service unit of the second member chassis when the first member chassis is an active chassis for the mobile gateway.

In another embodiment, a member chassis of an interchassis redundancy group that operates as a mobile gateway to provide mobile service provider network subscribers with access to services of a packet data network includes a forwarding plane comprising a plurality of forwarding units to process subscriber data traffic associated with subscriber sessions for mobile devices when accessing the packet data network by the mobile service provider network. The member chassis also includes a decentralized control plane comprising a plurality of distributed subscriber management service units coupled by a switch to the forwarding plane, wherein the subscriber management service units serve as anchors for the subscriber sessions when the member chassis is an active chassis for the mobile gateway. The member chassis further includes a redundancy group that defines a backup association between one of the subscriber management service units and one of a plurality of subscriber management service units of another member chassis of the mobile gateway. The member chassis also includes a routing unit of the control plane, wherein the routing unit comprises a resource manager that negotiates parameters for a communication channel for the redundancy group. The member chassis further includes a session management daemon of the subscriber management service unit that establishes subscriber sessions anchored by the subscriber management service unit, wherein the session management daemon sends, via the communication channel, subscriber session data for the subscriber sessions anchored by the subscriber management service unit when the member chassis is an active chassis for the mobile gateway.

In another embodiment, a mobile gateway computing device includes computer-readable media having instructions for causing one or more programmable processors to receive a redundancy group that defines a backup association between one of a plurality of subscriber management service units of the computing device and one of a plurality of subscriber management service units of another computing device of the mobile gateway. The instructions also cause the programmable processors to negotiate parameters for a communication channel for the redundancy group, and anchor, with the subscriber management service unit of the computing device, one or more subscriber sessions for subscribers attached to the mobile gateway computing device via a mobile service provider network when the computing device is an active chassis for the mobile gateway. The instructions also cause the programmable processors to send, via the communication channel for the redundancy group, subscriber session data for the subscriber sessions from the subscriber management service unit of the computing device to the subscriber management service unit of the other computing device when the computing device is an active chassis for the mobile gateway.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
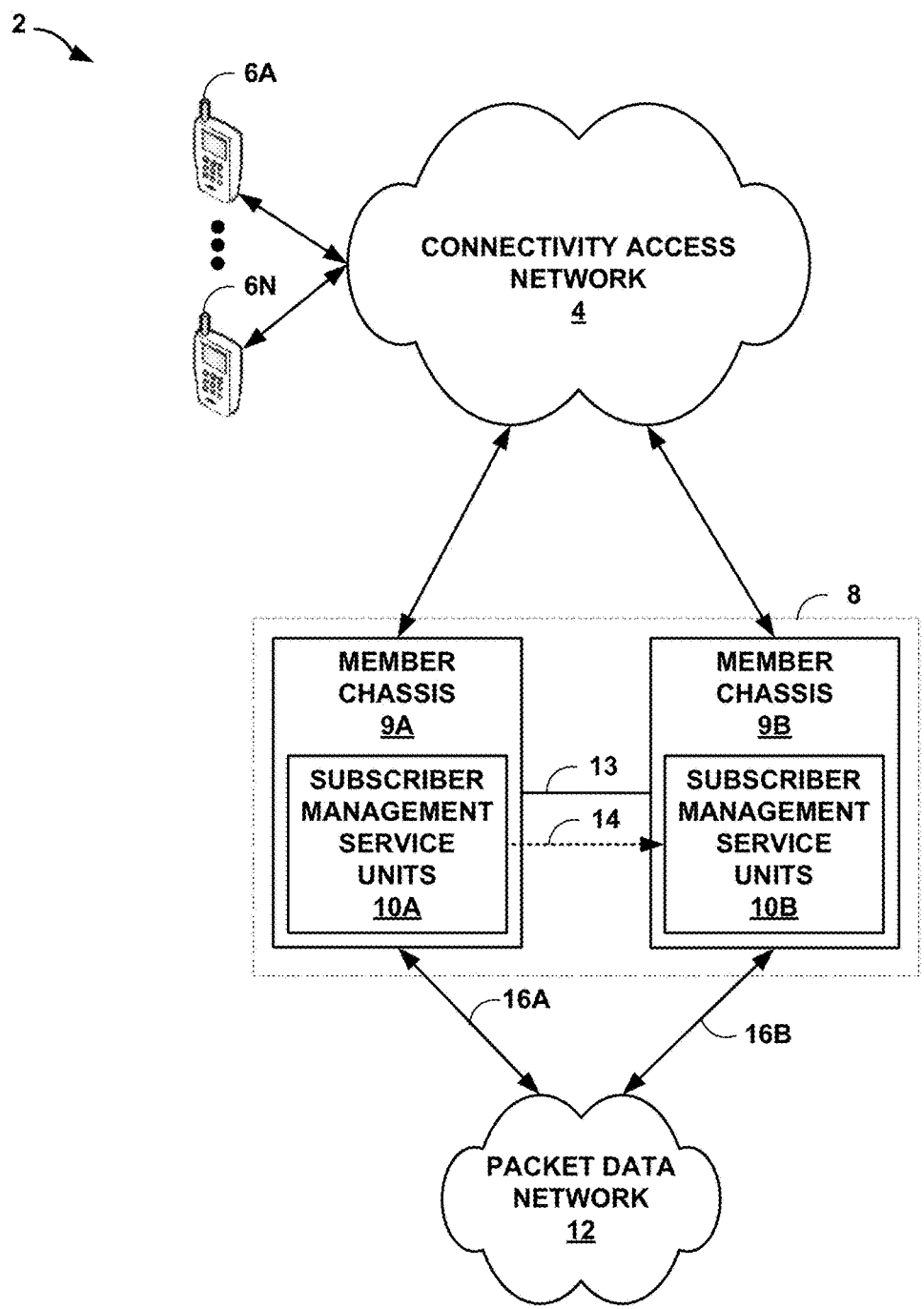
FIG. 1 is a block diagram illustrating an example network system in which redundant member chassis of a high-availability mobile gateway exchange subscriber session data in accordance with the interchassis redundancy techniques of this disclosure.

FIG. 1 is a block diagram illustrating an example network system 2 in which redundant member chassis 9A-9B ("member chassis 9") of a high-availability mobile gateway 8 exchange subscriber session data in accordance with the techniques of this disclosure. In this example, network system 2 comprises packet data network (PDN) 12 coupled to connectivity access network 4 ("CAN 4") via mobile gateway 8 of CAN 4. Packet data network 12 supports one or more packet-based services that are available for request and use by wireless devices 6A-6N ("wireless devices 6"). As examples, PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates CAN 4, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Each of wireless devices 6 is a wireless communication device for a subscriber (alternatively, a "subscriber device") that may comprise, for example, a mobile telephone, a laptop or desktop computer having, e.g., a 3G/4G wireless card, a wireless-capable netbook, a video game device, a pager, a smart phone, or a personal data assistant (PDA). Each of wireless devices 6 may run one or more applications, such as VoIP clients, video games, videoconferencing, E-mail, and Internet browsers, among others. Certain applications running on wireless device 6 may require access to services offered by PDN 12. Wireless devices 6 may also be referred to, in various architectural embodiments, as User Equipment (UE) or Mobile Stations (MS), and may alternatively be referred to herein as mobile devices.

A service provider operates CAN 4 to provide network access, data transport and other services to wireless devices 6 attached to CAN 4. In general, CAN 4 may implement any commonly defined cellular network architecture including those defined by standards bodies, such as a Global System for Mobile communication (GSM) Association, a 3rd Generation Partnership Project (3GPP), a 3rd Generation Partnership Project 2 (3GPP/2), an Internet Engineering Task Force (IETF) and a Worldwide Interoperability for Microwave Access (WiMAX) forum. For example, CAN 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Connectivity access network 4 may, alternatively or in conjunction with one of the above, implement a Code Division Multiple Access-2000 ("CDMA2000") or Enhanced Data Rates for GSM Evolution (EDGE) architecture. Connectivity access network 4 may, again as an alternative or in conjunction with one or more of the above, implement a WiMAX architecture defined by the WiMAX forum. Connectivity access network 4 may be alternatively referred to herein as a mobile service provider network.

In some examples, connectivity access network 4 may comprise a core packet-switched network (not shown in FIG. 1) and one or more radio access networks (also not shown in FIG. 1). A core packet-switched network of CAN 4 may comprise, for example, a general packet radio service (GPRS) core packet-switched network, an IP-based mobile multimedia core network, or an Evolved Packet Core (EPC) or Evolved Packet System (EPS). The core packet-switched network of CAN 4 comprises intermediate devices required to implement the control and data protocols of the particular architectural embodiment of CAN 4, such as Serving GPRS Serving Nodes (SGSNs), Serving Gateways (S-GWs) and Mobility Management Entities (MMES). Wireless devices 6 communicate with CAN 4 using a wireless communication link to one of the radio access networks of the connectivity access network. Radio access networks of CAN 4 may include, for example, for example, a GSM Radio Access Network (GRAN), a WiMAX radio access network, a UMTS Terrestrial Radio Access Network (UTRAN), and/or an evolution of a UTRAN for LTE networks known as an E-UTRAN. Connectivity access network 4 may further include a backhaul or transport network (not shown) that includes land-based transmission lines, frequently leased by a service provider for the connectivity access network, to transport user and control traffic between wireless devices 6 and mobile gateway 8. The backhaul network also includes network devices such as aggregation devices and routers. Further details of an example connectivity access network for a mobile network are described in U.S. patent application Ser. No. 12/905,771, entitled "COLLECTIVELY ADDRESSING WIRELESS DEVICES," filed Oct. 15, 2010, the entire contents being incorporated herein by reference.

In the illustrated example, mobile gateway 8 represents an interchassis redundancy (ICR) group that includes the collection of member chassis 9 operating as a single mobile gateway to PDN 12. Mobile gateway 8 may appear to devices in CAN 4 as a single gateway device despite including member chassis 9A-9B, which are each capable of independently operating as a mobile gateway to PDN 12. Interchassis redundancy provides high-availability to reduce subscriber downtime when one of the member chassis 9 fail or is otherwise unavailable to handle subscriber session management and subscriber data traffic forwarding. Unavailability may also be caused by uplink or access link failure.

Member chassis 9A, 9B are connected by interchassis link 13, a communication link. The term "communication link," as used herein, includes any form of transport medium, wired or wireless, and can include intermediate nodes such as network devices. Interchassis link 13 may therefore include a layer three network. Member chassis 9A, 9B have different network addresses (e.g., different IP addresses). These network addresses may be different that the gateway network address for mobile gateway 8, which may be a virtual network address.

In some instances, member chassis 9 may execute a Virtual Router Redundancy Protocol or other redundancy protocol to dynamically assign primary responsibility for mobile gateway 8 to one of member chassis 9 to implement ICR. In such instances, mobile gateway 8 is a virtual router, and member chassis 9A, 9B may be connected using virtual ports that exchange communications and packets for forwarding using interchassis link 13. Virtual Router Redundancy Protocol is described in additional detail in "Virtual Router Redundancy Protocol (VRRP) Version 3 for IPv4 and IPv6," Internet Engineering Task Force, Request for Comments 5798, which is incorporated by reference herein in its entirety. In some instances, only one of member chassis 9 advertises itself as an available router at any time to other routers of CAN 4 and to PDN 12. This member chassis actively performs the functionality of mobile gateway 8. In some instances, member chassis 9 are geographically dispersed to harden mobile gateway 8 against localized destructive events, such as a power outage or a natural disaster.

Member chassis 9 include a respective set of subscriber management service units 10A-10B that each provide a decentralized control plane for its member chassis. For example, subscriber management service units 10A include one or more service units that provide a decentralized control plane for member chassis 9A. At any time, one of member chassis 9 is actively performing the functionality of mobile gateway 8, including managing subscriber sessions and forwarding subscriber data traffic. This member chassis is the "active" member chassis. The other one of member chassis 9 is in a "standby" state ready to assume an active state upon failure of the currently active chassis. Hereinafter, reference to operations of mobile gateway 8 may refer to the operations of one the active one of member chassis 9 of mobile gateway 8. In addition, for ease of description, member chassis 9A and member chassis 9B are hereinafter designated as the active chassis and the standby chassis, respectively.

Mobile gateway 8 may comprise, for example, a Gateway GPRS Serving Node (GGSN), an Access Gateway (aGW), or a Packet Gateway (P-GW). Mobile gateway 8 may present a uniform interface to downstream nodes, such as SGSNs, S-GWs, and MMEs, to allow the downstream nodes to address service and/or signaling traffic to the uniform interface rather than separately directing such traffic among multiple devices or multiple control plane entities (e.g., service cards) within a single device. In some instances, the uniform interface is an IP address or other network layer address of mobile gateway 8 that is shared among all control plane entities, including respective subscriber management service units 10A-10B of member chassis 9. Because mobile gateway 8 implements ICR, the uniform interface may be in some instances be a virtual IP address.

In some implementations, mobile gateway 8 may be a router that executes routing protocols to identify routes through CAN 4 or PDN 12 to various destinations. In such implementations, each of member chassis 9 comprises a router capable of independently executing mobile gateway 8 functionality, including executing routing protocols. While described herein with respect to one or more particular architectures for ease of illustration purposes, CAN 4 may implement any architecture including those set forth by any standards body and those proprietarily owned. Moreover, the techniques may apply to any mobile data protocol supported by these architectures and to any device that implements or otherwise uses such mobile data protocols. For example, the techniques described with respect to mobile gateway 8 may be performed by downstream nodes, such as SGSNs, S-GWs, and MMEs. The techniques therefore should not be limited to cellular architectures referenced to herein and the mobile data protocols supported by these architectures. Mobile gateway 8 and other elements of connectivity access network 4 may, therefore, each represent an abstraction of devices found within any type of mobile network architectures.

Connectivity access network 4 establishes and operates bearers to transport user traffic, in the form of PDP packet data units (PDUs), referred to hereinafter as "packets." In general, a bearer is a set of network resources and data transport functions in CAN 4 to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Any of wireless devices 6 initiates an attach request to attach to CAN 4 to enable service traffic exchange with PDN 12. Connectivity access network 4 notifies mobile gateway 8 of the attach request. For example, mobile gateway 8 may receive a request to create a subscriber session from a subscriber, such as a Create Session Request message transmitted by a Serving Gateway (S-GW) to mobile gateway 8 operating as a PGW of an EPC of an LTE network or a Create PDP Context Request transmitted by an SGSN to mobile gateway 8 operating as a GGSN of a GPRS packet-switched network. Any of subscriber management service units 10A-10B that are components of the active one of member chassis 9 may receive the attach request and establish a CAN session for the requesting wireless device 6 by executing control protocols to identify and authenticate the wireless device, receive PDP address configuration information, and communicate with CAN 4 to establish bearers to carry user traffic for the requesting wireless device 6, among other operations. In general, a CAN session is an association between CAN 4 and any of wireless devices 6 that is identifiable by a combination of a wireless device 6 PDP address and an Access Point Name (APN) for a service provided by PDN 12. That is, the CAN session (alternatively referred to herein as a "subscriber session" or "session") is a service-specific (as specified by the APN) session for a service provided to the associated one of wireless devices 6. Besides establishing a default bearer, the attach procedure may trigger establishment, by CAN 4, of one or more dedicated bearers between mobile gateway 8 and the requesting wireless device 6 to carry user traffic. In an IP-based connectivity access network 4, a subscriber session comprises an IP-CAN session.

A subscriber management service unit that establishes and manages a subscriber session "anchors" the subscriber session such that control traffic pertaining to the CAN session is handled by the subscriber management service unit. Any one of subscriber management service units 10A-10B may anchor a session for any service (identified, for instance, by an Access Point Name (APN)) for which mobile gateway 8 operates as a gateway. In addition, an anchoring subscriber management service unit for a subscriber session may program the forwarding plane with forwarding information that directs forwarding plane processing and forwarding of subscriber data traffic associated with the subscriber session.

Member chassis 9A, 9B have non-uniform architectures and/or architectural configurations that preclude a simple correspondence between control plane components, as represented in FIG. 1 by subscriber management service units 10A, 10B. In other words, there does not exist between subscriber management service units 10A and subscriber management service units 10B a one-to-one correspondence of service unit type, capabilities, parameters, and chassis location. Various units of subscriber management service units 10A, 10B may have divergent subscriber session load capacities, for example, where subscriber session load capacity (or "session load capacity") for a subscriber management service refers to the number of sessions that may be concurrently anchored by the unit; subscriber management service units 10A, 10B may have different numbers of service units; those units of subscriber management service units 10A, 10B that have similar session load capacities may be located in dissimilar slots in their respective containing member chassis 9. The respective chassis of member chassis 9 may also be dissimilar, having more or fewer available slots, for example. Additional details regarding handling subscriber sessions with a decentralized control plane of multiple subscriber management service units may be found in U.S. patent application Ser. No. 13/172,556, entitled "MOBILE GATEWAY HAVING DECENTRALIZED CONTROL PLANE FOR ANCHORING SUBSCRIBER SESSIONS," filed Jun. 29, 2011, the entire contents being incorporated herein.

Member chassis 9 accomplish ICR by recreating subscriber sessions on the standby chassis that are originally terminated on the active chassis. More specifically, subscriber management service units 10A of active member chassis 9A send one or more backup messages 14 to subscriber management service units 10B of standby member chassis 9B. Backup messages 14 include subscriber session data that subscriber management service units 10B use to self-populate the subscriber sessions in preparation for a failure member chassis 9A and the assumption by member chassis 9B of an active role in performing the functionality of mobile gateway 8.

In accordance with techniques of this disclosure, configuration data stored on each of member chassis 9 associates a pair of individual units drawn from subscriber management service units 10A, 10B, respectfully. The association is a backup association that notifies member chassis 9 that subscriber sessions terminated on an active one of the units are to be backed up to the standby one of the units (the active/standby states of the units being inherited from the state of the containing one of member chassis 9). For example, configuration data on member chassis 9 may define one of subscriber management service units 10B as a standby unit for one of subscriber management service units 10A. The association defined by the configuration data is not dependent upon similar characteristics of the individual units. That is, unit pairs that are associated by the configuration data may occupy different slots within their respective member chassis 9, may have different hardware types and correspondingly different session load capacities, performance characteristics, chipset architectures, and so on. In addition, a subscriber management service unit of one member chassis may have backup associations with multiple subscriber management service units of the other member chassis.

Member chassis 9 negotiate separate communication channels over interchassis link 13 for each of the backup associations and provide parameters for a communication channel to subscriber management service units that belong to the backup association. For example, member chassis 9A negotiates a communication channel for a backup association in which one of subscriber management service units 10A is a member. Member chassis 9A then provides the parameters for that communication channel to the subscriber management service unit. Subscriber management service units 10A use the separate communication channels to exchange subscriber session data with corresponding backup subscriber management service units 10B as defined by the backup associations. As a result, the techniques may eliminate slot location dependency that otherwise constrains interchassis redundancy to member chassis of uniform architectures and configurations.

In addition, each of subscriber management service units 10 may exchange subscriber session data only for those subscriber sessions anchored by the unit. In this way, each of subscriber management service unit 10A of active member chassis 9A need only backup a portion of rather than the entirety of subscriber session data for the member chassis. Upon a failure of active member chassis 9A (or of an uplink or access interface of the same), member chassis 9B assumes an active role and performs the functionality of mobile gateway 8 using backed up subscriber sessions on subscriber management service units 10B.

Figure 2:
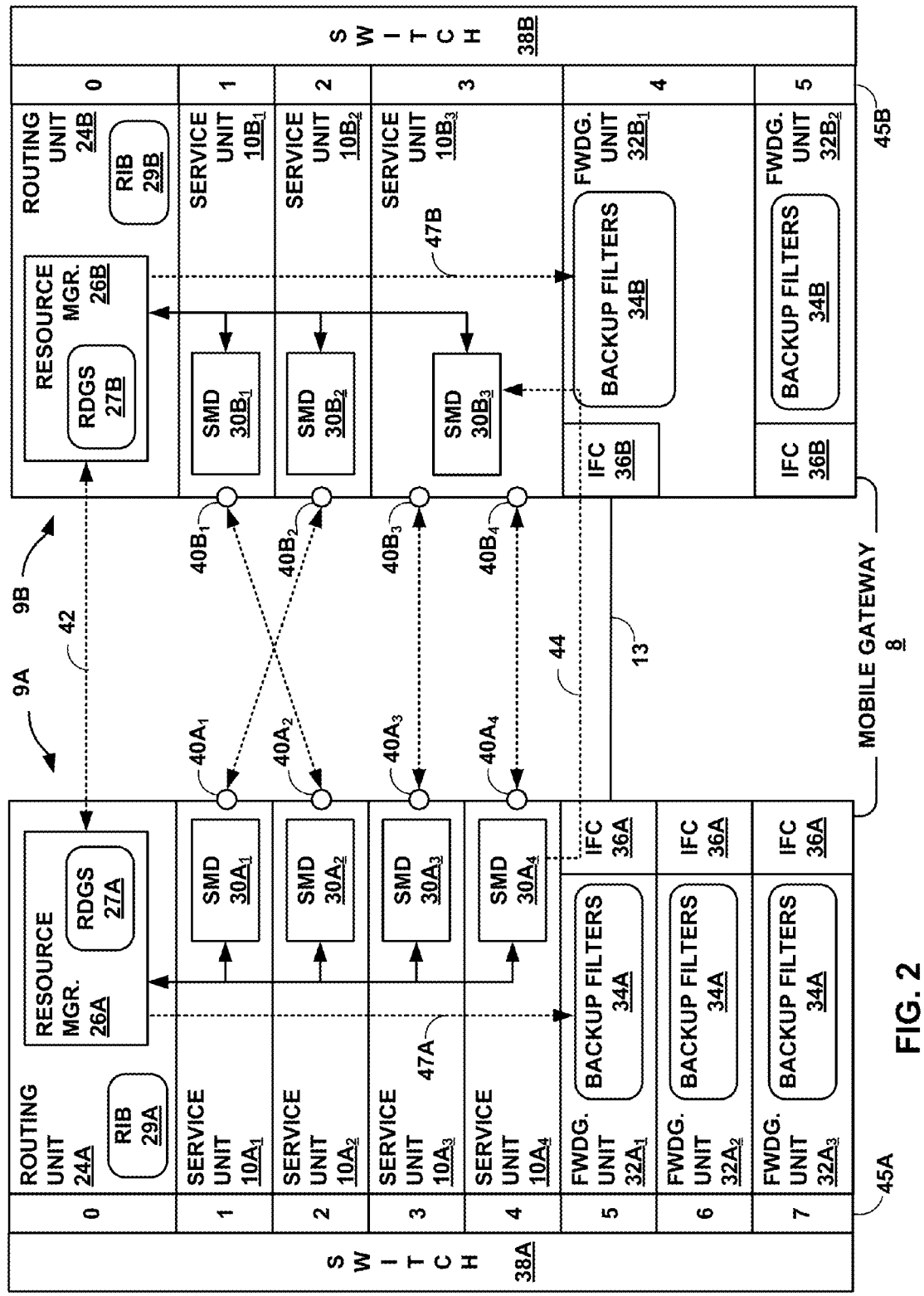
FIG. 2 is a block diagram illustrating, in detail, example embodiments of heterogenous member chassis having subscriber management service units that perform interchassis redundancy techniques of the mobile gateway of FIG. 1.

FIG. 2 is a block diagram illustrating detailed example embodiments of member chassis 9A, 9B of an interchassis redundancy group within mobile gateway 8. Like numerals are used to indicate like components from FIG. 1. In this example, member chassis 9A includes a decentralized control plane in that control plane functionality is distributed among routing unit 24A and a plurality of subscriber management service units $10A_1$-$10A_4$ ("subscriber management service units 10A," illustrated as "service units $10A_1$-$10A_4$"). Similarly, member chassis 9A includes a decentralized data or "forwarding" plane in that data plane functionality and packet forwarding functionality is distributed among a plurality of forwarding units $32A_1$-$32A_3$ ("forwarding units 32A"). In some instances, packet forwarding functionality may be consolidated in a single forwarding unit.

Each of routing unit 24A, subscriber management service units 10A, and forwarding units 32A may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 24A, subscriber management service units 10A, and forwarding units 32A may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Subscriber management service units 10A may represent example embodiments of subscriber management service units 10A of FIG. 1.

Member chassis 9A includes a number of slots 45A communicatively coupled by switch 38A. Each of slots 45A include connectors that engage components inserted therein and provide a physical interface to switch 38A. In this way, switch 38A therefore couples routing unit 24A, subscriber management service units 10A, and forwarding units 32A to deliver data units and control messages among the units. Switch 38A may represent an internal switch fabric or crossbar, bus, or link. Examples of high-speed multi-stage switch fabrics used as a data plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

The data plane of member chassis 9A represents hardware or a combination of hardware and software that forward network traffic in accordance with forwarding information. In the example member chassis 9A of FIG. 2, data plane 24 includes forwarding units 32A that provide high-speed forwarding of network traffic received by respective interface cards 36A ("IFCs 36A") via inbound links toward outbound links (with the exception of interchassis link 13, links not shown for ease of illustration). Interchassis link 13 connects IFC 36A of forwarding unit $32A_1$ to IFC 36B of forwarding unit $32B_1$ to couple member chassis 9. Forwarding units 32A receive and forward control and data packets via switch 38A along internal forwarding paths to anchoring units for the control and data packets. In general, subscriber management service units 10A anchor subscriber sessions in the control plane and so receive and process control packets associated with subscriber sessions, while forwarding units 32A anchor subscriber sessions in the data plane and so receive and process subscriber data packets associated with subscriber sessions. Further details of packet processing and forwarding by examples of forwarding units 32A is described in U.S. patent application Ser. No. 13/248,834, entitled "MOBILE GATEWAY HAVING REDUCED FORWARDING STATE FOR ANCHORING MOBILE SUBSCRIBERS," the entire content of which is incorporated by reference.

Forwarding units 32A may each comprise one or more packet forwarding engines ("PFEs") coupled to respective interface cards 36A and may each represent, for example, a dense port concentrator (DPC), modular port concentrator (MPC), flexible physical interface card (PIC) concentrator (FPC), or another line card, for example, that is inserted into a respective one of slots 45A of member chassis 9A. Each of forwarding units 32A may include substantially similar components to perform substantially similar functionality, said components and functionality being described hereinafter with respect to forwarding unit $32A_1$. However, each of forwarding units 32A may be of a different type with varying capabilities, capacities, and of course slot location.

Routing unit 24A of the decentralized control plane executes the routing functionality of member chassis 9A operating as mobile gateway 8. In this respect, routing unit 24A represents hardware or a combination of hardware and software of control that implements, with a routing protocol daemon, routing protocols by which routing information, stored in a routing information base 29A ("RIB 29A") may be exchanged with other routers. RIB 29A may include information defining a topology of a network, such as CAN 4 and/or PDN 12 of FIG. 1, and may include a route to member chassis 9B. Routing unit 24A may resolve the topology defined by routing information in RIB 29A to select or determine one or more routes through the network. Routing unit 24A may then update forwarding units 32A with these routes, where forwarding units 32A store these routes in respective forwarding information bases (not shown). Further details of one example embodiment of a router can be found in U.S. patent application Ser. No. 12/182,619, filed Jul. 30, 2008, entitled "STREAMLINED PACKET FORWARDING USING DYNAMIC FILTERS FOR ROUTING AND SECURITY IN A SHARED FORWARDING PLANE," which is incorporated herein by reference.

Subscriber management service units 10A of the decentralized control plane of member chassis 9A present a uniform interface to subscriber devices and provide decentralized subscriber session setup and management for mobile gateway 8. For example, all of subscriber management service units 10A may be addressable by the same IP or other PDP address, and control messages destined for the same IP or other PDP address of subscriber management service units 10A may therefore be handled by any of the service units. Internally, each of subscriber management service units 10A may include a unique identifier that identifies the service unit to other components of member chassis 9A. Subscriber management service units 10A identifiers may include, for example, an index, slot number for corresponding one of slots 45A, identifying string, internal IP address, or link layer address. Subscriber management service units 10A may each represent, for example, a packet forwarding engine (PFE) or other component of a physical interface card insertable within member chassis 20A. The physical interface card may be, for instance, a multi-services dense port concentrator (MS-DPC). One or more of subscriber management service units 10A may also each represent a co-processor executing on a routing node, such as routing unit 24A. Subscriber management service units 10A may be alternatively referred to as "service or session PICs" or "service or session cards." Each of subscriber management service units 10A includes substantially similar components to perform substantially similar functionality. For example, subscriber management service units 10A each include a corresponding one of session management daemons $30A_1$-$30A_4$ ("SMDs 30A"). Components and functionality of subscriber management service units 10A are described hereinafter with respect to subscriber management service unit $10A_1$ (alternatively referenced hereinafter as "service unit $10A_1$").

Session management daemon $30A_1$ of service unit $10A_1$ establishes subscriber sessions requested by a connectivity access network serviced by mobile gateway 8 and manages the sessions once established. Each of subscriber management service units 10A includes an instance of an SMD and may therefore independently execute control plane protocols required to establish a requested session for a subscriber. In this sense, subscriber management service units 10A provide a form of a decentralized control plane for managing subscriber communication sessions. As a result, mobile gateway 8 as operated by member chassis 9A may achieve increased scalability to handle thousands or millions of concurrent communication sessions from mobile devices.

Member chassis 9B includes components that perform functionality similar to those described with respect to member chassis 9A, where like numerals are used to indicate like components of member chassis 9A. Specifically, member chassis 9B also includes a routing unit 24B, a plurality of subscriber management service units $10B_1$-$10B_2$, a plurality of forwarding units $32B_1$-$32B_2$, a switch 38B, and slots 45B. The architecture and configuration of member chassis 9B is heterogenous to that of member chassis 9A. In the illustrated example, member chassis 9B has fewer slots, fewer subscriber management service units, and fewer forwarding units than does member chassis 9A. In addition, service unit $10B_3$ is illustrated as larger in FIG. 2 to indicate a relatively higher session load capacity vis-à-vis the other service units 10. Similarly, forwarding unit $32B_1$ is illustrated as larger in FIG. 2 to indicate a relatively higher session load capacity vis-à-vis the other forwarding units 32.

Resource manager 26A of routing unit 24A allocates and manages resources of member chassis 9A, including allocating sessions for anchoring by subscriber management service units 10A. Resource manager 26A may allocate sessions according to control or data protocol session identifiers, such as IP addresses for wireless devices attached to mobile gateway 8. Session allocation in this manner is described more fully in "MOBILE GATEWAY HAVING REDUCED FORWARDING STATE FOR ANCHORING MOBILE SUBSCRIBERS," incorporated above. Alternatively, resource manager 26A may account for current session loads among subscriber management service units 10A and facilitate equitable utilization by centrally distributing incoming session requests among the service units based on their respective session loads. SMDs 30A establish subscriber sessions according to the allocation determined by resource manager 26A.

Resource manager 26A includes redundancy groups 27A ("RDGs 27A"), a set of one or more data structures that each defines characteristics of a corresponding one of subscriber management service units 10A and associate the corresponding service unit with a backup subscriber management service units 10B of member chassis 9B. Each of RDGs 27A may specify for the corresponding service unit, for example, an association identifier, a service unit identifier, a service unit slot identifier, and a service unit session load capacity. Similarly, resource manager 26B includes RDGs 27B that define characteristics for corresponding subscriber management service units 10B. RDGs 27A, 27B may be administratively configured using a management interface (executing, e.g., Simple Network Management Protocol) or may be generated by corresponding resource managers 26A, 26B using configuration information and service unit descriptive data received from the subscriber management service units. For example, subscriber management service unit $10A_1$ may upon startup or upon insertion provide a session load capacity to resource manager 26A, which resource manager 26A may use to create one of RDGs 27A for subscriber management service unit $10A_1$. In such instances, resource managers 26 additionally negotiate the association identifiers of RDGs 27 to define backup associations.

Figure 3:
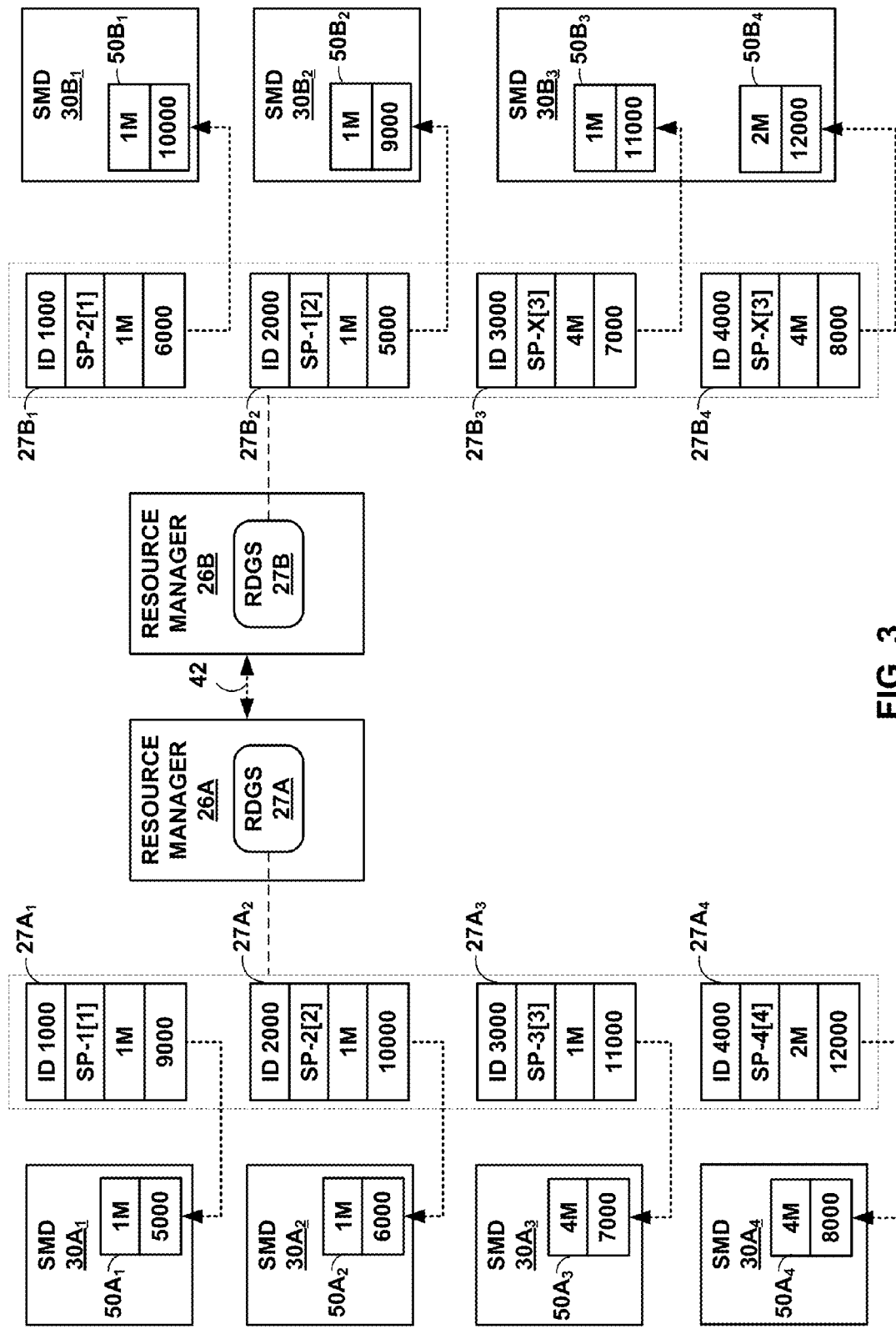
FIG. 3 is a block diagram illustrating example redundancy groups and negotiated backup communication channel parameters for performing interchassis redundancy techniques described herein.

The association identifier defines backup associations between pairs of RDGs drawn from each of RDGs 27A, 27B, as described more fully with respect to FIG. 3. These backup associations therefore also associate the corresponding subscriber management service units 10A, 10B for the RDG pairs. Resource managers 26 communicate using communication channel 42 to negotiate separate communication channels for each pair of RDGs 27A, 27B defined by the association identifiers. In this way, resource managers 26 also negotiate a separate communication channel for each subscriber management service unit defined by an RDG pair. Communication channel 42 may represent a well-known transport layer port for a transport layer protocol (e.g., Transport Control Protocol (TCP) or User Datagram Protocol (UDP)) that is operating over interchassis link 13. In some instances, an administrator may configure communication channels for RDG pairs/subscriber management service unit pairs.

In this example, resource managers 26 negotiate communication channels as port pairs for a transport layer protocol. Negotiated ports $40A_1$-$40A_4$ ("ports 40A") of subscriber management service units 10A each have an associated negotiated port $40B_1$-$40B_4$ ("ports 40B") of subscriber management service units 10B. These associations are illustrated in FIG. 2 as dashed lines between the associated ports, which also represent communication channels between the ports. For example, port $40A_1$ for the RDG 27A for service unit $10A_1$ is associated with port $40B_2$ for the RDG 27B for service unit $10B_2$. Port $40A_1$ is a source port for service unit $10A_1$ and a destination port for service unit $10B_2$.

After negotiating ports 40A, 40B for RDG pairs, resource managers 26 use filter installation messages 47A, 47B to install backup filters 34A, 34B to forwarding units 32. Backup filters 34A, 34B direct forwarding units to forward control traffic addressed to the member chassis network address and received on a matching port to the appropriate service unit. Each of backup filters 34A may therefore define, for example, an internal route within member chassis 20A that keys to a matching port 40A and maps to one of subscriber management service units 10A. Forwarding unit 32 may store respective backup filters 34 as a lookup tree or table that may be lookup primitive for a chained next hop of an internal forwarding path. Example details on internal forwarding paths of forwarding units 32 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference. Forwarding units 32A apply backup filters 34A to incoming network traffic received by IFCs 36A to direct traffic having a destination address and destination port that matches the network address and port for the filter toward the subscriber management service unit mapped by the filter. An example with respect to backup subscriber session data message 44 is described below.

In addition, resource managers 26 set, in each of SMDs 30, the standby member chassis network address and a negotiated destination port to cause the SMDs 30 to send backup subscriber session data to the negotiated destination port of the standby member chassis. Resource manager 26A sets in SMD $30A_1$, for instance, the network address for member chassis 9B and the port number for port $40B_2$. This causes SMD $30A_1$ to issue backup subscriber session data messages toward port $40B_2$ of member chassis 9B, which forwarding units $32B_1$ direct toward service unit $10B_2$ upon applying backup filters 34B. In this way, active subscriber management service units 10A may send and receive subscriber session data with associated standby subscriber management service units 10B. When member chassis 9A fails over to member chassis 9B, which assumes the active role to perform the functionality of mobile gateway 8, newly active subscriber management service units 10B may send and receive subscriber session data with associated newly standby subscriber management service units 10B.

As one example of backup data transmission to accomplish interchassis redundancy using techniques of this disclosure, SMD $30A_4$ issues backup subscriber session data message 44 using a communication channel negotiated by resource manager 26. The backup service unit for subscriber management service unit $10A_4$ as defined by RDGs 27A, 27B is subscriber management service unit $10B_3$. The communication channel used by SMD $30A_4$ to send backup subscriber session data message has a destination of port $40B_4$ of member chassis $10B_3$. SMD $30A_4$ therefore sends backup subscriber session data message 44, including subscriber session data for subscriber sessions anchored by SMD $30A_4$, to port $40B_4$ at the network address of member chassis 9B. The techniques therefore allow SMD $30A_4$ to send only a portion of the subscriber session data stored by member chassis 9A to service unit $10B_3$ of member chassis 9B.

Forwarding unit $32B_1$ receives backup subscriber session data message 44 using IFC 36B coupled to member chassis 9A via interchassis link 13. Forwarding unit $32B_1$ applies backup filters 34B to the destination port and destination network address of subscriber session data message 44. The destination port and destination network address key to a backup filter that routes matching traffic to service unit $10B_3$. Accordingly, forwarding unit $32B_1$ forwards subscriber session data message 44 to $10B_3$, which SMD $30B_3$ uses to populate backup subscriber sessions using the subscriber session data therein. The techniques may therefore allow slot location independence in combination with interchassis redundancy. Upon failover from member chassis 9A to member chassis 9B, service unit $10B_3$ anchors the subscriber sessions to terminate subscriber attachments previously terminated by service unit $10A_4$.

FIG. 3 is a block diagram illustrating example redundancy groups and negotiated backup communication channel parameters in further detail. Like numerals are used to indicate like components from FIG. 2. RDGs 27A include RDGs $27A_1$-$27A_4$ for corresponding subscriber management service units $10A_1$-$10A_4$. RDGs 27B include RDGs $27B_1$-$27B_4$ that together with RDGs 27A define a backup association for each of subscriber management service units $10B_1$-$10B_3$ with at least one of subscriber management service units $10A_1$-$10A_4$. Each of RDGs 27A, 27B includes an association identifier ("ID"), a service unit identifier, a service unit slot identifier, a service unit session load capacity, and a negotiated port for the corresponding service unit at which the service unit receives backup subscriber session data messages. This negotiated port for a service unit differs from the negotiated destination port to which the service unit sends backup subscriber session data messages. For example, RDGs $27A_1$ stores for subscriber management service unit $10A_1$ an association identifier of 1000, a service unit identifier of "SP-1", a service unit slot identifier of [1], a service unit session load capacity of 1M, and a negotiated port of 9000.

RDGs 27A, 27B that have matching association identifiers form backup associations. Resource managers 26 negotiate separate communication channels for each of the backup associations defined by RDGs 27A, 27B, which in this instance includes negotiated destination ports for the RDGs. In addition, in this instance, resource managers 26 also exchange respective session load capacities specified in the RDGs. Resource managers receive a negotiated destination port and session load capacity for a remote service management subscriber unit and store this data to one of backup unit description structures 50A, 50B. Backup unit description structures $50A_1$-$50A_4$ each store a negotiated destination port and a session load capacity that corresponds to one of backup subscriber management service units 10B. Similarly, backup unit description structures $50B_1$-$50B_4$ each store a negotiated destination port and a session load capacity that corresponds to one of backup subscriber management service units 10A. For example, backup unit description structure $50A_3$ includes a negotiated destination port (7000) and a session load capacity (4M) for subscriber management service unit $10B_3$. Backup unit description structures 50A, 50B may also store a destination network address for the backup member chassis. By providing backup unit description information over communication channel 42, member chassis 9 may avoid storing a detailed configuration that describes the architecture and/or configuration of the other member chassis.

SMDs 30A, 30B use backup unit description structures 50A, 50B respectively stored therein to identify a communication channel over which to send backup subscriber session data messages. SMD $30A_3$ storing backup unit description structure $50A_3$ sends backup subscriber session data messages to member chassis 9B using port 7000. SMD $30B_3$ by application of backup filters 34B receives such messages and recreates subscriber sessions on subscriber management service unit $10B_3$ based on the subscriber session data therein. As described in further detail with respect to FIG. 4, SMDs 30A, 30B use backup unit description structures 50A, 50B respectively stored therein to also manage subscriber session allocation among corresponding backup service units based on respective session load capacities. SMDs 30A, 30B may in some instances store representative copies RDGs 27A, 27B.

Figure 4:
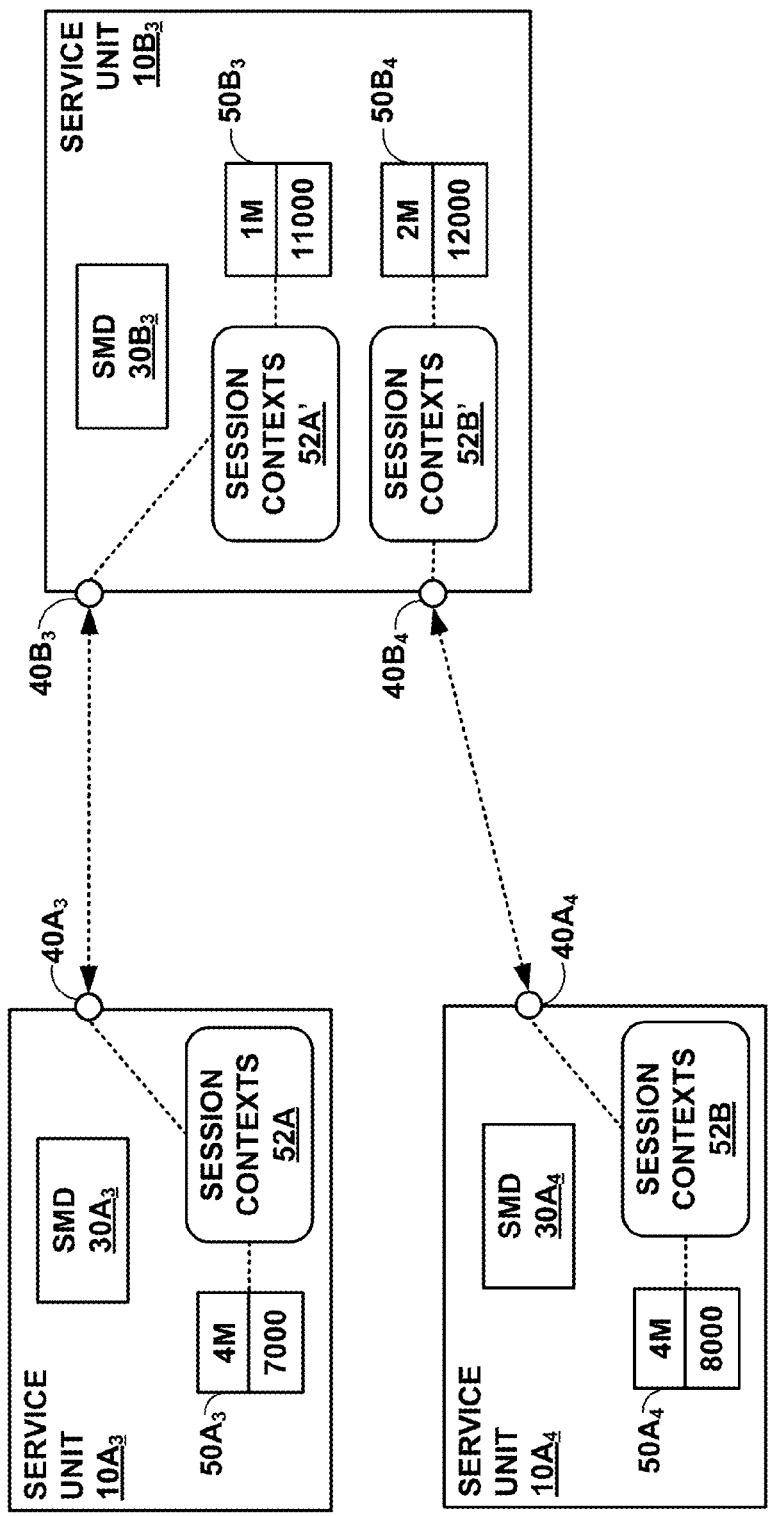
FIG. 4 is a block diagram illustrating subscriber management service units of FIG. 2 in further detail.

FIG. 4 is a block diagram illustrating subscriber management service units of FIG. 2 in further detail. Each of the service units includes a set of session contexts 52, which store subscriber session or "context" data. A session context stored in session contexts 52 for a session in which a wireless device participates may store session context information including, for example, the PDP (e.g., IP) address allocated by a Dynamic Host Configuration Protocol (DHCP) server or another entity for the wireless device for use in sending and receiving subscriber packets, forwarding information used by forwarding units 32 in forwarding subscriber packets such as GPRS Tunneling Protocol (GTP) tunnel endpoint identifiers (TEIDs) and identifiers/addresses for downstream nodes, the Access Point Name (APN) for the session, charging information, and one or more quality of service (QoS) profiles for the associated subscriber.

Where associated active and backup service units have different capacities, as in the illustrated instance, a single service unit may act as a standby for a plurality of active service units. Contrariwise, a plurality of service units may act as standbys for a single active service unit. In accordance with techniques of this disclosure, SMDs 30 segregates session contexts to ensure equitable distribution of contexts among service units 10, which may improve performance. A set of session contexts 52 is associated with one of backup unit description structures 50 by the SMD 30 of the service unit that stores the session contexts. For example, subscriber management service unit $10B_3$ associates session contexts 52A' with backup unit description structure $50B_3$ and associates session contexts 52B' with backup unit description structure $50B_4$. In addition, when an SMD 30 receives backup subscriber session data messages at a particular destination port, the SMD 30 stores the session context information therein to a set of session contexts 52 associated with the destination port due to the association of the set of contexts with the particular one of backup unit description structures 50. Thus, for example, SMD $30B_3$ stores session contexts 52A, sent by SMD $30A_3$ in backup subscriber session data messages to port $40B_3$, to session contexts 52A'. In this way, SMDs 30 segregates session contexts 52 within service units 10 to divide the session contexts among one or more backup service units 10. SMDs 30 may segregate one of session contexts 52 by, for instance, associating each one of the session contexts therein with a particular value associated with one of backup unit description structures 50, a pointer that resolves to one of backup unit description structures 50.

SMDs 30 for active subscriber management service units 10 also establish subscriber sessions responsive to received attach requests, and the SMDs 30 associate session contexts with backup unit description structures 50 based on session load capacities specified by backup unit description structures 50. This may ensure equitable distribution of new subscriber sessions established by active service units 10 among associated backup service units 10. In the example of FIG. 4, service unit $10B_3$ may assume active status and receive and response to attach requests. Backup unit description structures $50B_3$, $50B_4$ specify session load capacities of 1M, 2M, respectively, for subscriber management service units $10A_3$, $10A_4$ that are standby service units for service unit $10B_3$ upon its assuming active status. To maintain a distribution that is correlative to session load capacities, SMD $30B_3$ allocates session contexts for newly established subscriber sessions based on the respective session load capacities defined by backup unit description structures $50B_3$, $50B_4$, which in this instance defines a ratio of 1:2. In other words, in general, for every two session contexts added to session contexts 52B' for new subscriber sessions, SMD $30B_3$ adds one session context to session contexts 52A'. SMD $30B_3$ backs up the session contexts 52A', 52B' to session contexts 52A, 52B of standby service units $10A_3$, $10A_4$ according to the described techniques.

Figure 5:
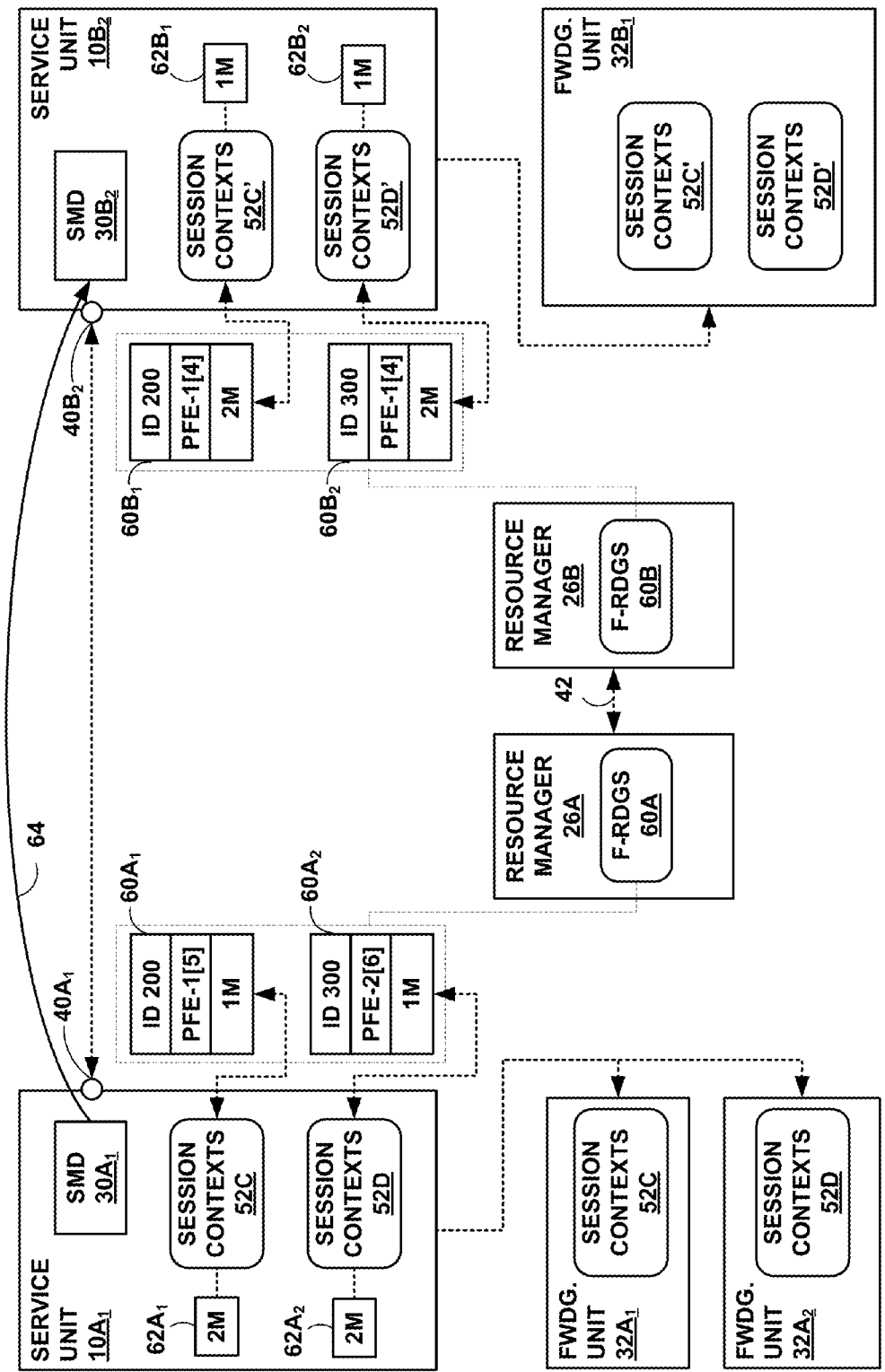
FIG. 5 is a block diagram illustrating, in detail, example components of the member chassis of FIG. 2 that perform forwarding unit interchassis redundancy techniques of this disclosure.

FIG. 5 is a block diagram illustrating, in further detail, example components of member chassis 9 of FIG. 2 that perform forwarding unit interchassis redundancy techniques of this disclosure. Like numerals are used to indicate like components from FIG. 1. Session management daemon $30A_1$ of subscriber management service unit $10A_1$ uses interchassis redundancy techniques similar to those described above with respect to FIGS. 1-4 to back up session contexts to standby service unit $10B_2$. While described and illustrated with respect to these components of member chassis 9 of FIG. 2, the techniques may be performed by any of the example components of FIG. 2.

Resource manager 26A includes forwarding unit redundancy groups (F-RDGs) 60A, a set of one or more data structures that each defines characteristics of a corresponding one of forwarding units 32A and associates the corresponding forwarding unit with a backup subscriber management service units 10B of member chassis 9B. Each of F-RDGs 60A may specify for the corresponding forwarding unit, for example, an association identifier that defines a backup forwarding unit association with one of F-RDGs 60B, a forwarding unit identifier, a forwarding unit slot identifier, and a forwarding unit session load capacity. For example, F-RDGs $60A_1$ stores for forwarding unit $32A_1$ an association identifier of 200, a forwarding unit identifier of "PFE-1", a forwarding unit slot identifier of [5], and a forwarding unit session load capacity of 1M. Similarly, resource manager 26B includes F-RDGs 60B that define characteristics for corresponding forwarding units 32B.

F-RDGs 60A, 60B may be administratively configured using a management interface (executing, e.g., Simple Network Management Protocol) or may be generated by corresponding resource managers 26A, 26B using configuration information and forwarding unit descriptive data received from the forwarding units. For example, forwarding unit $32A_1$ may upon startup or upon insertion provide a session load capacity to resource manager 26A, which resource manager 26A may use to create one of F-RDG $60A_1$ for forwarding unit $32A_1$. In such instances, resource managers 26 additionally negotiate the association identifiers of F-RDGs 27 to define backup associations.

F-RDGs 60A, 60B that have matching association identifiers form backup forwarding unit associations between individual forwarding units drawn from forwarding units 32A, 32B. In the illustrated example, service units $10A_1$ and $10B_2$ backup subscriber session information using backup forwarding unit associations between forwarding units $32A_1$ and $32B_1$ and between forwarding units $32A_2$ and $32B_1$. These backup forwarding unit associations are defined by F-RDGs $60A_1$ and $60B_1$ and by F-RDGs $60A_2$ and $60B_2$, respectively.

Resource managers 26 exchange session load capacities specified in pairs of F-RDGs 60A, 60B using communication channel 42. Resource managers 26 receive a session load capacity for a remote forwarding unit and store this data to one of backup forwarding unit description structures 62A, 62B of service unit $10A_1$ or service unit $10B_2$. Backup forwarding unit description structures $62A_1$, $62A_2$ each store a session load capacity that corresponds to forwarding unit $32B_1$. For example, backup forwarding unit description structure $62A_2$ includes a session load capacity (2M) for forwarding unit $32B_1$. Similarly, backup forwarding unit description structures $62B_1$, $62B_2$ each store a session load capacity that corresponds to one of forwarding units $32A_1$, $32A_2$. By providing backup forwarding unit description information over communication channel 42, member chassis 9 may avoid storing a detailed configuration that describes the architecture and/or configuration of the other member chassis.

As control plane anchors for subscriber sessions, subscriber management service units 10 handle configuration of forwarding units 32 for constructing subscriber-specific forwarding paths for processing and forwarding data traffic from the mobile devices. For example, SMDs 30 executes control protocols to create or modify session contexts 52 that include data protocol session identifiers that determine packet processing and forwarding subscriber data traffic associated with respective session contexts 52. SMDs 30 may program session contexts 52 to respective, anchoring forwarding units 32 for use by forwarding units 32 in forwarding associated subscriber packets. For example, SMD $30A_1$ establishes subscriber sessions and stores subscriber session information for a subset of the subscriber sessions to session contexts 52C of service unit $10A_1$. SMD $30A_1$ also programs via an interface (not shown) a representation of session contexts 52C to session contexts 52C of forwarding unit $32A_1$. This representation may include internal forwarding paths of a forwarding unit $32A_1$ ASIC for forwarding associated subscriber data traffic. SMDs 30 may store representations of session contexts to corresponding service units 10 and send the representations to backup service unit to accomplish interchassis redundancy. Each of service units 10 may anchor in the control plane subscriber sessions that are anchored in the data plane by one or more forwarding units 32. In other words, there is a many-to-many relationship between service units 10 and forwarding units 32. Session contexts 52C, 52D are associated with service unit $10B_2$ via RDGs 27, as described above. Thus, session contexts 52C, 52D may represent two subsets of the set of all session contexts anchored in the control plane by service units $10A_1$.

Forwarding unit $32A_1$, for instance, receives subscriber packets, maps the subscriber packets to a session context in session contexts 52C, and applies forwarding constructs to forward the subscriber packets according to the session context data. For example, forwarding of downstream subscriber packets by forwarding unit $32A_1$ for a particular session may include encapsulating the subscriber packets using GTP and setting the specified downstream TEID for the session within a GTP-U header. Forwarding of upstream subscriber packets by forwarding unit $32A_1$ for a particular session may include decapsulating the subscriber packets of GTP-U headers, mapping the upstream TEID to one of session contexts 52C, and forwarding the subscriber packets according to the mapped session context. Any one of forwarding units 32 may operate as an anchoring forwarding unit for a session context to perform forwarding functionality on subscriber packets associated with the session. In other words, subscriber traffic for each of session contexts 52 is handled by a different one of forwarding units 32 for the associated subscriber session (i.e., the anchor forwarding unit). The anchor forwarding unit for subscriber traffic may be different than the ingress or egress forwarding unit for the subscriber traffic. The respective anchor forwarding units for upstream and downstream subscriber traffic for a subscriber session may be the same forwarding unit or different forwarding units. Example details on subscriber management service units 10 constructing subscriber-specific forwarding paths within forwarding units 32 can be found in U.S. patent application Ser. No. 13/172,505, referenced above.

In accordance with techniques of this disclosure, SMDs 30A, 30B in this instance mediate backup operations for session contexts 52 to ensure session contexts anchored by a particular active one of forwarding units 32A are anchored by the standby one of forwarding units 32B that has a backup forwarding unit association with the particular forwarding unit as defined by F-RDGs 60A, 60B. However, each of SMDs 30A, 30B may mediate backup operations only for those session contexts 52 managed by the SMD. For example, SMD $30A_1$ of service unit $10A_1$ may mediate backup operations only for session contexts 52C, 52D, and not for session contexts corresponding to subscriber sessions anchored by other service units 10A.

SMD $30A_1$ uses a communication channel established by resource managers 26, as described above with respect to FIG. 2, to send subscriber session information to SMD $30B_2$ in backup forwarding unit subscriber session message 64. Because SMD $30A_1$ may send, over a single communication channel, session subscriber information for subscriber sessions anchored in the data plane by a number of different forwarding units 32, SMD $30A_1$ may add an association identifier of F-RDGs 60A to the backup forwarding unit subscriber session message 64. In this way, SMD $30B_2$ may disambiguate subscriber session information for subscriber sessions anchored in different forwarding units $32B_1$. For example, SMD $30A_1$ may add an association identifier of 200 to backup forwarding unit subscriber session message 64 to use in sending subscriber session information for session contexts 52C. SMD $30B_2$ receives message 64, keys the association identifier of 200 to F-RDG $60B_2$, and therefore installs the subscriber session information to subscriber contexts 52C'. In some instances, subscriber session information includes a logical representation of subscriber sessions installed to corresponding forwarding units 32, such as a binary file to be loaded to a forwarding unit ASIC. In this way, SMD $30A_1$ and SMD $30B_2$ synchronize the logical representation of session contexts 52C, 52D of forwarding units $32A_1$, $32A_2$, as seen by SMD $30A_1$, with the logical representation of session contexts 52C', 52D', as seen by SMD $30B_2$. SMD $30B_2$ programs session contexts 52C', 52D' to forwarding unit $32B_1$.

Where associated active and backup forwarding units have different capacities, as in the illustrated instance, a single forwarding unit may act as a standby for a plurality of active forwarding units. Contrariwise, a plurality of forwarding units may act as standbys for a single active forwarding unit. In accordance with techniques of this disclosure, SMDs 30 segregates session contexts to ensure equitable distribution of contexts among forwarding units 32, which may improve performance. A set of session contexts 52 is associated with one of backup unit description structures 62 by the SMD 30 of the service unit that stores the session contexts. For example, subscriber management service unit $10B_2$ associates session contexts 52C' with backup unit description structure $62B_1$ and associates session contexts 52D' with backup unit description structure $62B_2$. SMDs 30 may segregate one of session contexts 52 by, for instance, associating each one of the session contexts therein with a particular value associated with one of backup unit description structures 62, a pointer that resolves to one of backup unit description structures 62.

SMDs 30 for active subscriber management service units 10 may also select anchor forwarding units 32 based on session load capacities specified by backup unit description structures 62. This may ensure equitable distribution of new subscriber sessions established by active service units 10 and programmed to active forwarding units 32 among associated backup forwarding units 32. For example, service unit $10B_2$ may assume active status and receive and response to attach requests. Backup unit description structures $62B_1$, $62B_2$ specify session load capacities of 1M, 1M, respectively, for forwarding units $32A_1$, $32A_2$ that are standby forwarding units for forwarding unit $32B_1$ upon its assuming active status. To maintain a distribution that is correlative to session load capacities, SMD $30B_2$ allocates session contexts for newly established subscriber sessions among session contexts 52C', 52D' based on the respective session load capacities defined by backup unit description structures $62B_1$, $62B_2$, which in this instance defines a ratio of 1:1. SMD $30B_3$ backs up the session contexts 52C', 52D' to session contexts 52C, 52D of standby service unit $10A_1$ according to the described techniques.

Figure 6:
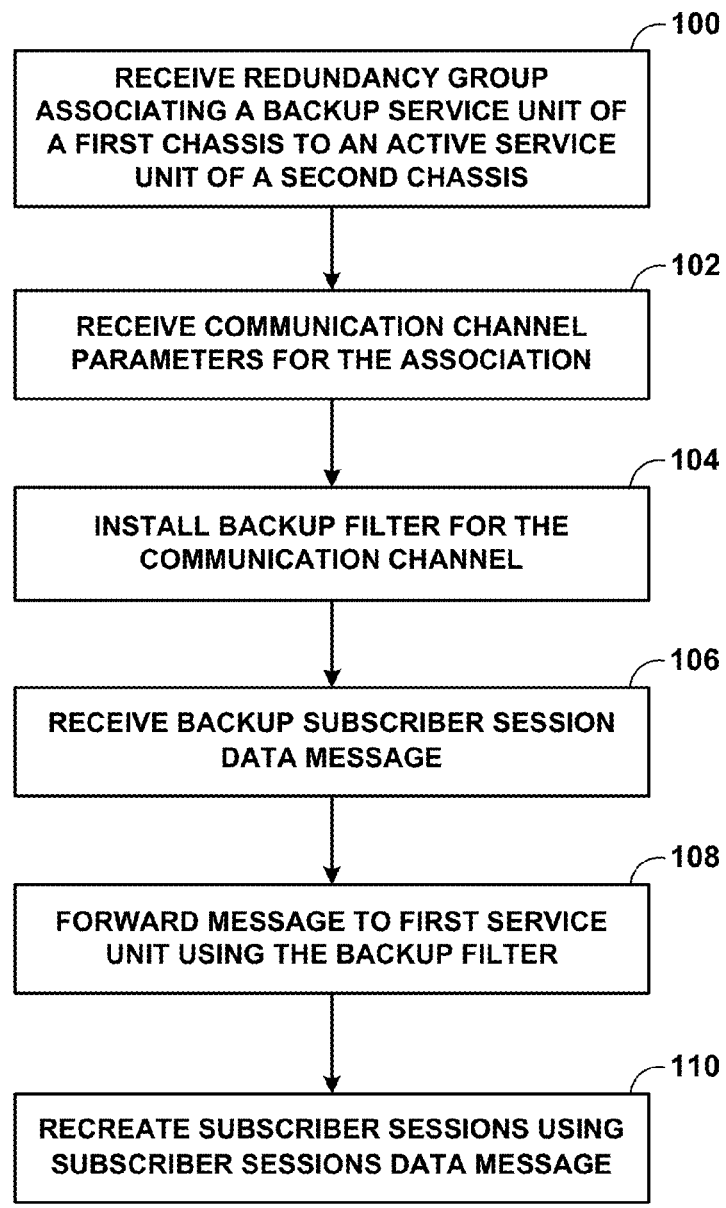
FIG. 6 is a flowchart illustrating an example mode of operation of the member chassis of FIG. 2 to accomplish interchassis redundancy according to techniques of this disclosure.

FIG. 6 is a flowchart illustrating an example mode of operation of member chassis 9A of FIG. 2 to accomplish interchassis redundancy according to techniques of this disclosure. Resource manager 26A receives one of redundancy groups 27A that associates one of service units 10A of member chassis 9A of mobile gateway 8 as a backup service unit for one of service units 10B of member chassis 9B of the mobile gateway (100). Resource managers 26A, 26B negotiate, over communication channel 42, communication channel parameters for backup associations defined by RDGs 27A, 27B, and resource manager 26A receives communication channel parameters for the association defined by the received RDG (102).

Upon receiving the communication channel parameters, resource manager 26A generates and installs a backup filter 34 to forwarding units 32 that keys to the communication channel parameters and maps to the backup service unit associated in the received RDG (104). Subsequently, one of IFCs 36A receives a backup subscriber session data message 44 via interchassis link 13 (106). Forwarding unit $32A_1$ applies backup filters 34A to key communication channel parameters included in message 44 to the above-referenced backup filter, which directs forwarding unit $32A_1$ to forward, via switch 38A, message 44 to the backup service unit (108). The backup service unit uses the backup subscriber sessions data included in message 44 to recreate subscriber sessions and maintain subscriber session synchronicity in preparation for failover by active member chassis 9B (110).

Figure 7:
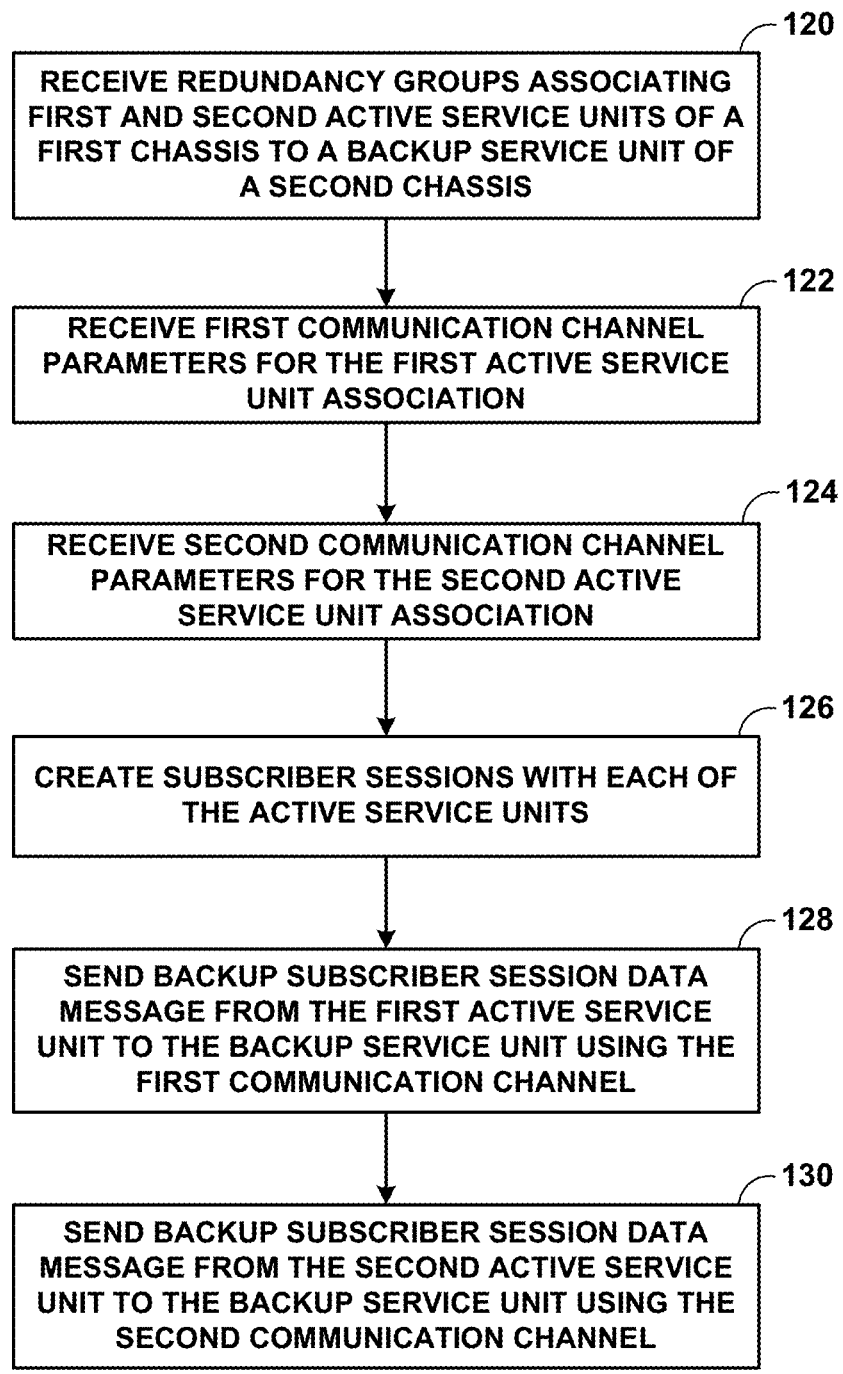
FIG. 7 is a flowchart illustrating an example mode of operation of the member chassis of FIG. 2 to accomplish interchassis redundancy according to techniques of this disclosure.

FIG. 7 is a flowchart illustrating an example mode of operation of member chassis 9A of FIG. 2 to accomplish interchassis redundancy according to techniques of this disclosure. Resource manager 26A receives redundancy groups 27A that associate service unit $10B_3$ of member chassis 9B of mobile gateway 8 as a backup service unit for currently active service units $10A_3$ and $10A_4$ of member chassis 9B of the mobile gateway (120). Resource managers 26A, 26B negotiate, over communication channel 42, communication channel parameters for backup associations defined by RDGs 27A, 27B, and resource manager 26A receives first communication channel parameters for the first backup association defined by the received RDG for service unit $10B_3$ and service unit $10A_3$ (122). Resource manager 26B also receives second communication channel parameters for the second backup association defined by the received RDG for service unit $10B_3$ and service unit $10A_4$ (124).

Service units $10A_3$ and $10A_4$ of currently active member chassis 9A receive requests to create subscriber sessions and SMDs $30A_3$ and $30A_4$ responsively establish the subscriber sessions (126). In addition, SMD $30A_3$ sends a backup subscriber session data message to service unit $10B_3$ using the first communication channel (128), while SMD $30A_4$ sends a backup subscriber session data message to service unit $10B_4$ using the first communication channel (130). In this manner, service units $10A_3$ and $10A_4$ may maintain subscriber session synchronicity on service unit $10B_3$ in preparation for failover by active member chassis 9A.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

What is claimed is:

1. A method of providing interchassis redundancy within a mobile gateway that provides mobile service provider network subscribers with access to services of a packet data network, the method comprising:
receiving, with a first member chassis of the mobile gateway, a redundancy group that defines a backup association between a subscriber management service unit of a plurality of subscriber management service units within the first member chassis and a subscriber management service unit of a plurality of subscriber management service units within a second member chassis of the mobile gateway;
negotiating, with the first member chassis, parameters for a communication channel for the redundancy group;
anchoring, with the subscriber management service unit within the first member chassis, one or more subscriber sessions for subscribers attached to the mobile gateway via the mobile service provider network when the first member chassis is an active chassis for the mobile gateway; and
sending, when the first member chassis is an active chassis for the mobile gateway and via the communication channel for the redundancy group, subscriber session data for the subscriber sessions from the subscriber management service unit within the first member chassis to the subscriber management service unit within the second member chassis.

2. The method of claim 1, further comprising:
receiving, with the first member chassis when the first member chassis is a standby chassis for the mobile gateway, subscriber session data on the communication channel;
forwarding, based at least on the parameters for the communication channel, the subscriber session data to the subscriber management service unit within the first member chassis;
recreating subscriber sessions on the first member chassis using the subscriber session data; and
switching to active mode upon failover by the second member chassis to perform mobile gateway functionality for the recreated subscriber sessions.

3. The method of claim 1, further comprising:
installing a backup filter to a forwarding unit within the first member chassis, wherein the backup filter matches the parameters for the communication channel and directs the forwarding unit to forward incoming traffic received on the communication channel to the subscriber management service unit within the first member chassis;
receiving, with the first member chassis when the first member chassis is a standby chassis for the mobile gateway and on the communication channel, incoming traffic that includes subscriber session data; and
applying the backup filter to the parameters for the communication channel received in the incoming traffic to forward the subscriber session data to the subscriber management service unit within the first member chassis.

4. The method of claim 1, wherein the parameters for the communication channel include at least one of a network address and a transport layer port.

5. The method of claim 1, wherein the first member chassis and second member chassis form an interchassis redundancy group that determines, from among the first member chassis and the second member chassis, the active member chassis that implements subscriber sessions to operate as the mobile gateway.

6. The method of claim 1,
wherein the redundancy group is a first redundancy group,
wherein the subscriber management service unit within the second member chassis is a first subscriber management service unit,
wherein the plurality of subscriber management service units within the first member chassis and the plurality of subscriber management service units within the second member chassis are heterogenous to one another, the method further comprising:
receiving, with the first member chassis, a second redundancy group that defines a backup association between the subscriber management service unit within the first member chassis and a second subscriber management service unit of a plurality of subscriber management service units within the second member chassis;
negotiating, with the first member chassis, parameters for a communication channel for the second redundancy group;
associating a first subset of subscriber sessions anchored by the subscriber management service unit within the first member chassis with the communication channel for the first redundancy group;
sending, via the communication channel for the first redundancy group, subscriber session data for the first subset of subscriber sessions from the subscriber management service unit within the first member chassis to the first subscriber management service unit within the second member chassis;

associating a second subset of subscriber sessions anchored by the subscriber management service unit within the first member chassis with the communication channel for the second redundancy group; and sending, via the communication channel for the second redundancy group, subscriber session data for the second subset of subscriber sessions from the subscriber management service unit within the first member chassis to the second subscriber management service unit within the second member chassis.

7. The method of claim 6, further comprising:

receiving, with the first member chassis, a first subscriber session load capacity for the first subscriber management service unit within the second member chassis;

receiving, with the first member chassis, a second subscriber session load capacity for the second subscriber management service unit within the second member chassis;

determining, with the subscriber management service unit within the first member chassis, a ratio of the first subscriber session load capacity to the second subscriber session load capacity; and allocating, with the subscriber management service unit within the first member chassis, anchored subscriber sessions among the first subset of subscriber sessions and the second subset of subscriber sessions according to the ratio.

8. The method of claim 6, wherein the communication channel for the first redundancy group and the communication channel for the second redundancy group are different transport layer links that operate over a single interchassis network link.

9. The method of claim 1, wherein the redundancy group specifies an association identifier that defines the backup association by matching an association identifier of a redundancy group stored by the second member chassis.

10. The method of claim 1, wherein the first member chassis comprises a plurality of forwarding units that each anchor, in the forwarding plane, zero or more of the subscriber sessions for the subscriber management service unit within the first member chassis to process subscriber data packets associated with the anchored subscriber sessions, the method further comprising:

receiving, with the first member chassis, a first forwarding unit redundancy group that defines a backup forwarding unit association between a forwarding unit of the plurality of forwarding units within the first member chassis and a first a forwarding unit of a plurality of forwarding units within the second member chassis; and sending, with the subscriber management service unit within the first member chassis and via the communication channel for the redundancy group, sessions contexts installed to the forwarding unit within the first member chassis by the subscriber management service unit within the first member chassis for subscriber sessions anchored by the subscriber management service unit within the first member chassis.

11. The method of claim 10, further comprising:

receiving, with the first member chassis, a second forwarding unit redundancy group that defines a backup forwarding unit association between forwarding unit within the first member chassis and a second forwarding unit of a plurality of forwarding units within the second member chassis; and sending, with the subscriber management service unit within the first member chassis and via the communication channel for the redundancy group, sessions contexts installed to the forwarding unit within the first member chassis by the subscriber management service unit within the first member chassis for subscriber sessions anchored by the subscriber management service unit within the first member chassis.

12. The method of claim 11, further comprising:

associating a first subset of sessions contexts installed to the forwarding unit within the first member chassis by the subscriber management service unit with the first forwarding unit redundancy group;

sending, via the communication channel for the redundancy group, the first subset of session contexts in a backup forwarding unit subscriber session message that includes an association identifier for the first forwarding unit redundancy group;

associating a second subset of sessions contexts installed to the forwarding unit within the first member chassis by the subscriber management service unit with the first forwarding unit redundancy group; and sending, via the communication channel for the redundancy group, the second subset of session contexts in a backup forwarding unit subscriber session message that includes an association identifier for the second forwarding unit redundancy group.

13. The method of claim 11, further comprising:

receiving a first subscriber session load capacity for the first forwarding unit within the second member chassis;

receiving a second subscriber session load capacity for the second forwarding unit within the second member chassis; and associating session contexts with the first subset or second subset according to a ratio of the first subscriber session load capacity and second first subscriber session load capacity.

14. The method of claim 1, wherein the first member chassis comprises a plurality of forwarding units that each anchor, in the forwarding plane, zero or more of the subscriber sessions for the subscriber management service unit within the first member chassis to process subscriber data packets associated with the anchored subscriber sessions, the method further comprising:

receiving, with the first member chassis, a first forwarding unit redundancy group that defines a backup forwarding unit association between a first a forwarding unit of the plurality of forwarding units within the first member chassis and a forwarding unit of a plurality of forwarding units within the second member chassis, wherein the plurality of forwarding units within the first member chassis and plurality of forwarding units within the second member chassis are heterogenous to one another;

receiving, with the first member chassis, a second forwarding unit redundancy group that defines a backup forwarding unit association between a second one of the plurality of forwarding units within the first member chassis and the forwarding unit within the second member chassis;

receiving, with the first member chassis and via the communication channel for the redundancy group, a first subset of session contexts in a backup forwarding unit subscriber session message that includes an association identifier for the first forwarding unit redundancy group;

identifying the first forwarding unit within the first member chassis from the association identifier for the first forwarding unit redundancy group and installing the first subset of session contexts to the first forwarding unit within the first member chassis;

receiving, with the first member chassis and via the communication channel for the redundancy group, a second subset of session contexts in a backup forwarding unit subscriber session message that includes an association identifier for the second forwarding unit redundancy group; and identifying the second forwarding unit within the first member chassis from the association identifier for the second forwarding unit redundancy group and installing the second subset of session contexts to the second forwarding unit within the first member chassis.

15. A member chassis of an interchassis redundancy group that operates as a mobile gateway to provide mobile service provider network subscribers with access to services of a packet data network, the member chassis comprising:

a forwarding plane comprising a plurality of forwarding units to process subscriber data traffic associated with subscriber sessions for mobile devices when accessing the packet data network by the mobile service provider network;

a decentralized control plane comprising a plurality of distributed subscriber management service units coupled by a switch to the forwarding plane, wherein the subscriber management service units serve as anchors for the subscriber sessions when the member chassis is an active chassis for the mobile gateway;

a redundancy group that defines a backup association between a subscriber management service unit of the subscriber management service units and a subscriber management service unit of a plurality of subscriber management service units within another member chassis of the mobile gateway;

a routing unit of the control plane, wherein the routing unit comprises a resource manager that negotiates parameters for a communication channel for the redundancy group; and a session management daemon of the subscriber management service unit that establishes subscriber sessions anchored by the subscriber management service unit, wherein the session management daemon sends, via the communication channel, subscriber session data for the subscriber sessions anchored by the subscriber management service unit when the member chassis is an active chassis for the mobile gateway.

16. The chassis of claim 15, wherein a forwarding unit of the plurality of forwarding units receives subscriber session data on the communication channel when the member chassis is a standby chassis for the mobile gateway, wherein the forwarding unit forwards, based at least on the parameters for the communication channel, the subscriber session data to the session management daemon, wherein the session management daemon recreates subscriber sessions using the subscriber session data when the member chassis is a standby chassis for the mobile gateway, and wherein the routing unit switches to active mode to perform mobile gateway functionality for the recreated subscriber sessions.

17. The chassis of claim 15, further comprising:

a backup filter of the forwarding unit that matches the parameters for the communication channel and directs the forwarding unit to forward incoming traffic received on the communication channel to the subscriber management service unit within the member chassis, wherein the forwarding unit receives, when the member chassis is a standby chassis for the mobile gateway and on the communication channel, incoming traffic that includes subscriber session data, and wherein the forwarding unit applies the backup filter to parameters for the communication channel received in the incoming traffic to forward the subscriber session data to the subscriber management service unit.

18. The chassis of claim 15, wherein the redundancy group is a first redundancy group, wherein the subscriber management service unit within the other member chassis is a first subscriber management service unit, wherein the plurality of subscriber management service units within the member chassis and the plurality of subscriber management service units within the other member chassis are heterogenous to one another, the chassis further comprising:

a second redundancy group that defines a backup association between the subscriber management service unit within the member chassis and a second subscriber management service unit of a plurality of subscriber management service units within the other member chassis, wherein the resource manager negotiates parameters for a communication channel for the second redundancy group;

a first subset of subscriber sessions anchored by the subscriber management service unit within the member chassis and associated with the communication channel for the first redundancy group, wherein the session management daemon sends, via the communication channel for the first redundancy group, subscriber session data for the first subset of subscriber sessions to the first subscriber management service unit within the other member chassis; and a second subset of subscriber sessions anchored by the subscriber management service unit within the member chassis and associated with the communication channel for the second redundancy group, wherein the session management daemon sends, via the communication channel for the second redundancy group, subscriber session data for the second subset of subscriber sessions from the subscriber management service unit within the member chassis to the second subscriber management service unit within the second member chassis.

19. The chassis of claim 18, further comprising:

a first backup unit description structure that stores a first subscriber session load capacity for the first subscriber management service unit within the other member chassis; and a second backup unit description structure that stores a first subscriber session load capacity for the second subscriber management service unit within the other member chassis, wherein the session management daemon determines a ratio of the first subscriber session load capacity to the second subscriber session load capacity and allocates anchored subscriber sessions among the first subset of subscriber sessions and the second subset of subscriber sessions according to the ratio.

20. The chassis of claim 18, wherein the communication channel for the first redundancy group and the communication channel for the second redundancy group are different transport layer links that operate over a single interchassis network link.

21. The chassis of claim 15, wherein the redundancy group specifies an association identifier that defines the backup association by matching an association identifier of a redundancy group stored by the other member chassis.

22. The chassis of claim 15,
wherein the plurality of forwarding units each anchor, in the forwarding plane, zero or more of the subscriber sessions for the subscriber management service unit to process subscriber data packets associated with the anchored subscriber sessions, the method further comprising:
a forwarding unit redundancy group that defines a backup forwarding unit association between a forwarding unit of the plurality of forwarding units and a forwarding unit of a plurality of forwarding units within the other member chassis,
wherein the subscriber management daemon sends, via the communication channel for the redundancy group, sessions contexts installed to the forwarding unit by the subscriber management daemon for subscriber sessions anchored by the subscriber management service unit.

23. A non-transitory computer-readable medium comprising instructions for causing one or more programmable processors of a mobile gateway computing device to:
receive a redundancy group that defines a backup association between a subscriber management service unit of a plurality of subscriber management service units of the mobile gateway computing device and a subscriber management service unit of a plurality of subscriber management service units of another computing device of the mobile gateway;
negotiate parameters for a communication channel for the redundancy group;
anchor, with the subscriber management service unit of the mobile gateway computing device, one or more subscriber sessions for subscribers attached to the mobile gateway computing device via a mobile service provider network when the computing device is an active chassis for the mobile gateway; and
send, when the mobile gateway computing device is an active chassis for the mobile gateway and via the communication channel for the redundancy group, subscriber session data for the subscriber sessions from the subscriber management service unit within the mobile gateway computing device to the subscriber management service unit within the other computing device.

* * * * *